BOOT-TREE & SHOE-LAST.
BY HENRY WIGHT.
OF Malden, Mass.
Oct. 7th 1869.
No. 118,663. Patented Aug. 29, 1871.
FIG. 1,
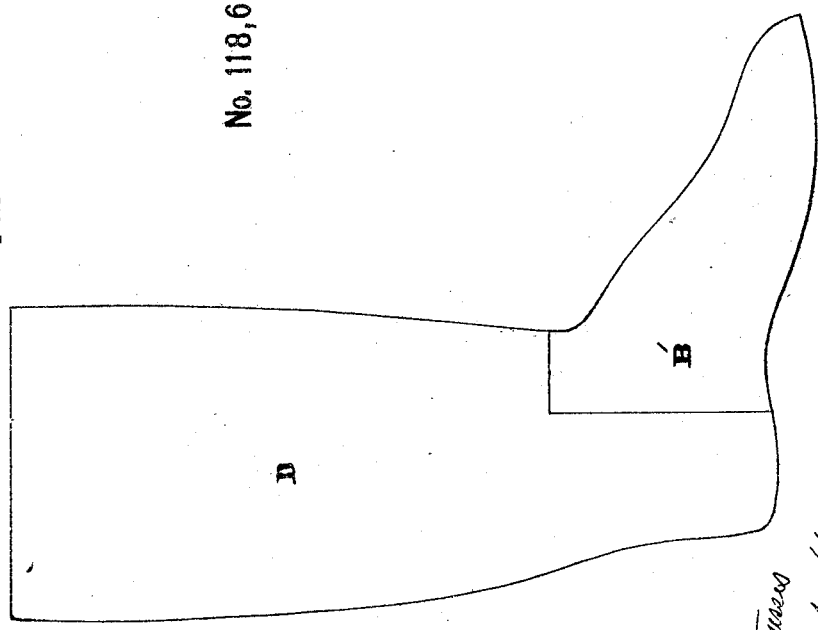
FIG. 2,
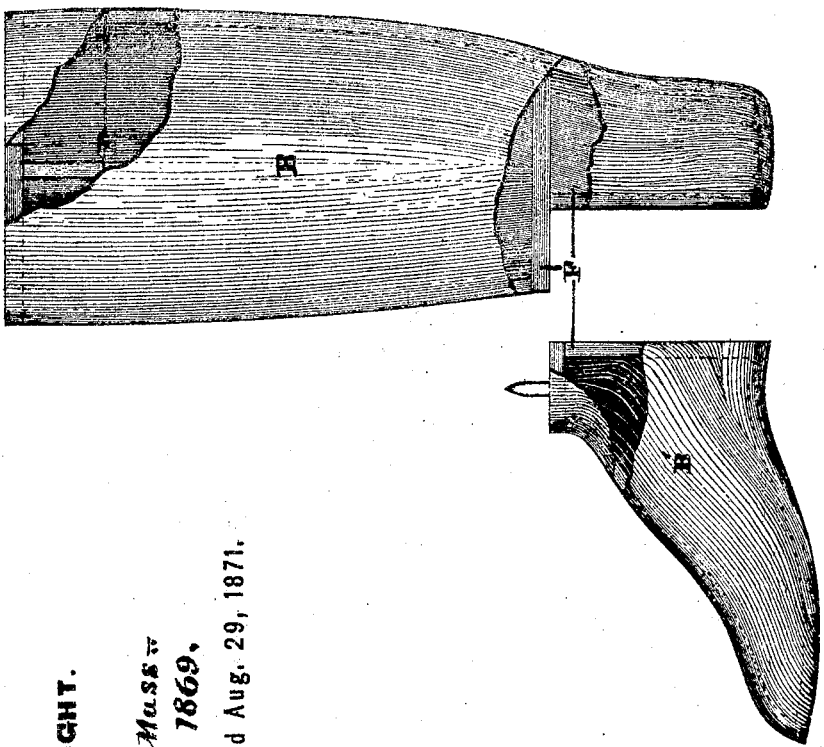

ly formed and fixed in their shape, as above, these parts are secured upon frames of the necessary shape to fit them interiorly by rubber cement and small tacks or pegs. If, however, the paper used be of sufficient thickness and firmness to endure the handling required the frame may be dispensed with, not being an absolutely essential feature of my invention.

UNITED STATES PATENT OFFICE.

HENRY WIGHT, OF MALDEN, MASSACHUSETTS.

IMPROVEMENT IN LASTS, &c.

Specification forming part of Letters Patent No. 118,663, dated August 29, 1871.

*To all whom it may concern:*

Be it known that I, HENRY WIGHT, of Malden, in the county of Middlesex and State of Massachusetts, have made certain Improvements in Lasts and Boot-Trees, of which the following is a specification:

My invention relates to boot-trees and shoe-lasts of a peculiar character as to material, method, and cost of manufacture, durability, and lightness.

Lasts and trees are usually made of wood, laboriously and carefully worked into the proper shape. Many of them are used in the manufacture of rubber boots and shoes, and they are subject during a part of the process to high heat. They are warped, shrunk, cracked, injured in symmetry, and soon destroyed. They are heavy, expensive, and otherwise objectionable.

My last and boot-tree are made of thick paper, straw-board, or any other similarly-pliable or malleable substance otherwise suitable. My tree and last may also be made by using some plastic material, as paper-pulp, and molding it to a form. I, however, prefer the material in sheets, like straw-board, &c. It is made, when sheet material is used, in parts cut in proper shape, and formed in a damp state over models of the requisite kind to make up the desired tree or last. While in this condition—that is, firmly secured to the model—the parts are subjected to the action of a suitable heat to set their forms beyond danger of any change or modification. After being thus prop- The last and boot-tree thus produced are light, cheap, durable, and retain their shape better than those made of wood, having no interior mass upon which the heat can act.

Figure 1 is the outline of a boot-tree in two pieces. Fig. 2 is an elevation of the same, broken away in places to show its internal structure.

B, Fig. 2, is the outside of the tree. F F is the frame or skeleton, to which the molded paper or other material is secured when it is necessary. The darkly-shaded spots show the inside of the hollow shell.

The construction of a last is not illustrated in the drawing, but is similar except in the matter of its form and lines of division, perhaps.

I claim—

A molded hollow-shell last or boot-tree made of sheet-paper, straw-board, paper-pulp, or other suitable plastic or pliable material, as shown and described, and for the purposes named.

HENRY WIGHT.

Witnesses:
A. F. SARGENT,
J. R. ATWOOD.